April 14, 1925.
J. SPILLER
PHORIOSCOPE
Filed March 12, 1923
1,533,573
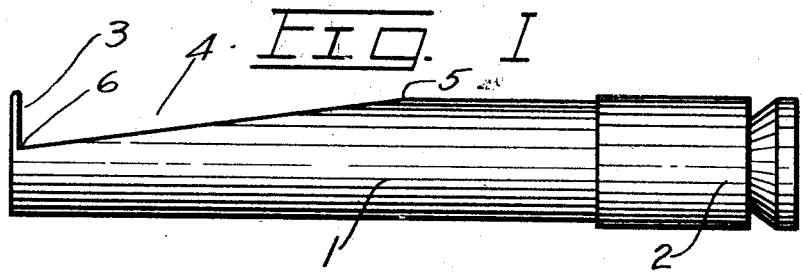
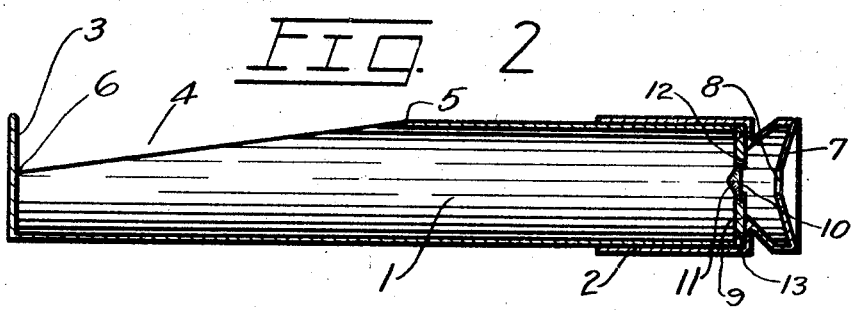
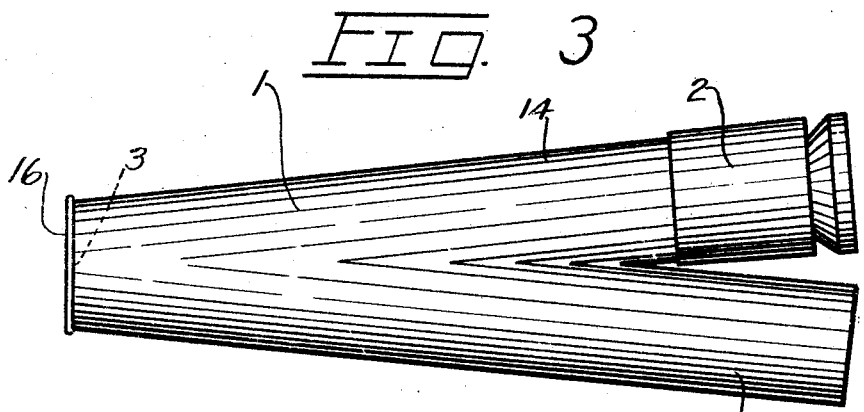
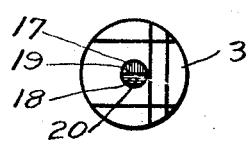
INVENTOR
Joseph Spiller
Harry Bowen
ATTORNEY Patented Apr. 14, 1925.

1,533,573

UNITED STATES PATENT OFFICE.

JOSEPH SPILLER, OF SEATTLE, WASHINGTON.

PHORIOSCOPE.

Application filed March 12, 1923. Serial No. 624,514.

*To all whom it may concern:*

Be it known that I, JOSEPH SPILLER, a citizen of the United States, residing at Seattle, in the county of King and State of Washington, have invented a new and useful Phorioscope; and I do hereby declare that the following is a full, clear, and exact specification, such as will enable others skilled in the art to which it appertains to make and use the same.

The invention is a device used in eye testing for diagnosing heterophoria, or the imbalance of the ocular muscles, which allows the proper optical alignment of the eye, having a sight hole, a testing device such as a double prism, and a chart, and which eliminates the annoying and misleading interference of visual impressions of surrounding objects.

The object of my invention is to provide a simple and efficient means for diagnosing the imbalance of the ocular muscles which permits the proper optical alignment of the eye with a sight hole, a double prism and a chart and an enclosure that eliminates visual impressions of surrounding objects.

Another object of the invention is to provide a means for diagnosing the imbalance of the ocular muscles through which one eye may see a chart through a double prism while the other eye may see the same chart through unobstructed space at the same time.

And another object of the invention is to provide a means for diagnosing the imbalance of the ocular muscles, while the eyes are viewing a chart having horizontal and vertical lines and a circle surrounding those lines by which the innervations of the eyes may be tested and determined as they are concentrating to count or study the lines, thereby evoking accommodative efforts under conditions, which eliminate to the greatest extent possible the function of the fusion sense.

With these ends in view the invention embodies a telescopic tube having an opening in one side, a sight hole in one end, a double prism a short distance from the sight hole, and a chart in the opposite end.

Other features and advantages of the invention will be seen from the following description taken in connection with the drawings, wherein:—

Figure 1 is a side view.

Figure 2 is a longitudinal section.

Figure 3 is a view showing an alternate design.

Figure 4 is a view of the chart.

In the drawings I have shown my instrument as it would be constructed wherein numeral 1 indicates the tube forming the body of the device, numeral 2 a tube which is slidably held on the former tube, and numeral 3 a chart which may be placed in the far end of the tube forming the body.

The body 1 may be constructed of a tube as shown with an opening 4 in one side which extends from a point 5 in the side of the tube to a point 6 at the center of one end. This end is made complete and arranged so that the chart 3 may be securely held in it.

The tube 2 may be constructed as shown with one end open and the other having a cup shaped closure 7 with a sight hole 8 in its center; and at a point a short distance from the end is a partition 9 with an opening 10 in its center in which a double prism 11 may be held in a recess 12. The partition 9 may be held to the tube 2 by screws 13 or in any suitable manner.

The design shown in Figure 3 may have a tube 14 which is similar to the device shown in Figure 1 and another tube 15 connected to its side or to the edges of the opening 4 shown in the former device so that the line of sight may follow down the center line of the tube instead of through the air. The device shown in Figure 3 may have an opening 16 at one end in which a transparent chart may be inserted. The interior of the tube 15 will be absolutely plain so that the line of vision will be unobstructed, and the interior of the tube 14 will be made similar to that of the tube shown in Figure 1 so that the line of vision will pass through the sight hole and the double prism or testing device. Therefore, this device may be used in the same manner and for the same purpose as that shown in Figure 1 as the only difference is in the providing of an enclosure for the unobstructed line of vision.

The chart 3 may be made as shown in Figure 4 with vertical lines 17 and horizontal lines 18 surrounded by a small circle 19 and also having a line 20 extending directly across it. This arrangement of lines is particularly adaptable to a device of this type because when the eye is concentrated to count the lines it is easy to judge the condition of the innervations. The use of the chart with horizontal and vertical straight lines in a circle is particularly adaptable for determining the ability of the eye to use the accommodative apparatus properly while convergence is in function, and the circle around the chart eliminates to the greatest possible extent the function of verticalizing and horizontalizing of the fusing sense.

It will be understood that changes may be made in the construction without departing from the spirit of the invention. One of which changes may be in the placing of the tube 2 around the inside of the tube 1 instead of on the outside. Another change may be in the design or size of the opening 4 or in the use of more openings than one. And still another change may be in the means for holding the prism 11 in the tube or in the use of some other device for testing which will perform the same function or a similar function to that of the prism shown.

The construction will be readily understood from the foregoing description. To use the device it may be held up to the eye so that one eye will see the chart 3 through the device and the other will see it direct.

Having thus fully described the invention, what I claim as new and desire to secure by Letters Patent, is:—

1. An instrument for diagnosing the imbalance of the ocular muscles comprising a telescoping casing having a chart in the far end; a sight opening in the opposite end; a testing device adjacent the sight opening and inside of the casing; and an opening in the side of the casing through which the chart in the far end may be seen.

2. An instrument for diagnosing heterophoria comprising a telescoping casing having a small opening in one end; a chart in the opposite end; a double prism in it a short distance from the end having the small opening; and an opening in the side of the casing adjacent the opposite end.

3. A device of the class described embodying a casing having a small opening in one end; another opening in its side and adjacent the end opposite to that in which is the small opening; a means in this end by which the concentration of the eye may be obtained; and a means adjacent the opposite end for testing the amount of the innervation.

4. An instrument for diagnosing the imbalance of the ocular muscles comprising a casing having a small opening in one end; a means adjacent the opening for temporarily suspending the function of the fusion sense of the eye; a chart in the opposite end; and an opening in its side through which the chart may be seen by the eye that is not looking through the small opening; and said chart having a small circle in its center which is divided in half with horizontal lines in one of said halves and vertical lines in the other.

5. An instrument for diagnosing heterophoria having a telescoping casing with a small opening in one end, a double prism in the casing adjacent the small opening; a chart in the opposite end; and an opening in its side and adjacent the end in which is the chart; said chart having a small circle in the center with straight vertical and horizontal lines in it.

6. An instrument for diagnosing the imbalance of the ocular muscles having a chart with a small circle having straight vertical and horizontal lines in it in its center; a sight hole before an adjustable testing device through which the line of sight from one eye must pass while being concentrated on the chart; said instrument being so arranged that the line of sight of the opposite eye may pass direct to the chart unobstructed.

7. An instrument for diagnosing the imbalance of the ocular muscles comprising a telescoping casing having in it a sight hole, a double prism and a chart in perfect optical alignment, and an opening in the side of the casing adjacent the end in which is the chart.

JOSEPH SPILLER.